United States Patent Office 3,235,576
Patented Feb. 15, 1966

3,235,576
PROCESS FOR PREPARING THE AMIDE OF OMEGA-AMINOCAPRYLIC ACID AND AMIDE PRODUCT
Gian Paolo Chiusoli and Pierluigi Perazzoni, Novara, Italy, assignors to Montecatini Società Generale per l'Industria Mineraria e Chimica, Milan, Italy
No Drawing. Filed Oct. 30, 1962, Ser. No. 234,211
Claims priority, application Italy, July 29, 1958, 11,605/58; Mar. 20, 1962, 5,460/62
5 Claims. (Cl. 260—404.5)

The present invention is a continuation-in-part of our application Serial No. 811,521, filed May 7, 1959 (now abandoned), and relates primarily to the preparation of the amide of omega-aminocaprylic acid from the methyl ester of 7-cyano-2,5-heptadienoic acid and to new compounds produced by the process or formed as intermediates in said process. Among the new compounds are the amides of 7-cyano-2,5-heptadienoic acid, 7-cyano-3,5-heptadienoic acid, 7-cyano-2,4-heptadienoic acid, suberic seminitrile, and omega-aminocaprylic acid.

The amide of omega-aminocaprylic acid has considerable importance since it can be directly polymerized to obtain the corresponding polyamide, that is nylon 8, the preparation of which has heretofore presented difficulties.

A particularly useful and advantageous feature of the process described hereinbelow is the possibility of obtaining omega-aminocaprylic amide, a product not known until now, by hydrogenation of the amide of suberic seminitrile. The latter amide was also not known. It can be obtained economically by treating the methyl ester of suberic seminitrile with ammonia.

The amide of suberic seminitrile can also be obtained by hydrogenation of the double bonds of 7-cyano-2,5-heptadienoic amide, which is also an unknown product. The 7-cyano-2,5-heptadienoic amide and the 7-cyano-3,5-heptadienoic acid are formed with surprising ease, contrary to what occurs with the corresponding saturated amides, by contacting a concentrated ammonia solution with the methyl ester of 7-cyano-2,5-heptadienoic acid.

The yields are surprisingly high when it is considered that formation of secondary products, to a great extent, is to be expected.

The methyl ester of 7-cyano-2,5-heptadienoic acid is the object of copending patent application Serial No. 765,739, filed October 7, 1958, now Patent No. 3,146,256, of one of the applicants. It can be used either after distillation or in the raw state as obtained by the synthesis from chlorocyanobutene, acetylene, and carbon monoxide. This fact represents another very significant advantage of the process, since it makes possible the obtainment of a solid crystallizable derivative by starting from the raw product, and thus eliminating the distillation. In this relation it should be noted that the cycle described below does not require any distillation, but only the crystallization of the amides.

For best results, the obtainment of omega-aminocaprylic amide in the last stage requires a particularly careful technique in order to avoid loss of ammonia in the polycondensation reactions, because the product is not very stable above 50° C. Moreover, the hydrogenation and the crystallization should preferably be carried out in certain solvents, such as dioxane and tetrahydrofurane. These solvents make is possible to carry out the final hydrogenation with the aid of catalysts based on nickel or cobalt, in the presence of ammonia in order to avoid the formation of the secondary amine, and also to crystallize the product by simple concentration. This is another very important feature of the present invention.

The series of products which serve to prepare the omega-aminocaprylic amide is shown in the following reaction scheme:

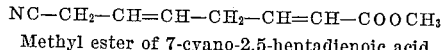
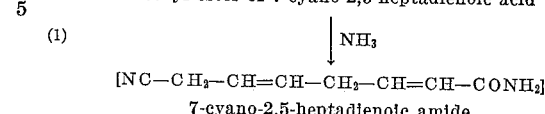
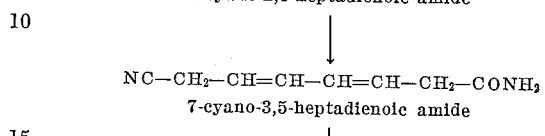
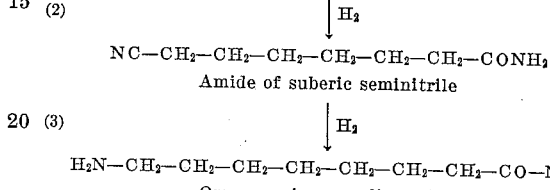
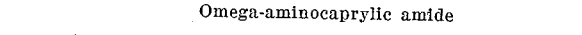
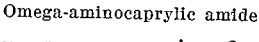

An alternative process comprises first hydrogenating the cyano-heptadienoic ester as described in a preceding patent of the applicants and then treating with ammonia the ester of suberic seminitrile to obtain the amide of suberic seminitrile. In substance, the order of the two first operations is inverted. This alternative process is convenient if the preparation of the unsaturated amide is not carried out by starting from the raw product. Moreover, the yield in amide is higher and the product is purer. It should also be noted that the preparation of the amide of suberic seminitrile can be carried out at room temperature and that the use of ammonia under pressure, to provide aqueous ammonia solutions having a concentration higher than 30%, makes it possible to lower the reaction time and to obtain very high yields of practically pure product.

Another alternative consists in carrying out the hydrogenation directly, in a single stage, by starting from the unsaturated amide.

Use of the above-mentioned solvents has the advantage of making it possible to obtain aminocaprylic amide in a single stage.

With reference to the details of the process, a number of advantageous expedients employed in carrying it out are noted as follows:

The methyl ester of 7-cyano-2,5-heptadienoic acid is contacted with aqueous ammonia, preferably in concentrated solution, at a temperature of between 0° and 50° C., preferably between 15° and 30° C., while agitating continuously in order to facilitate contact between the two phases.

The precipitation of most of the 7-cyano-heptadienoic amide as a white solid takes place within a few hours.

The product is separated by filtration. Further product is separated by concentrating the mother liquor. The mother liquor can also be recycled. The same operation can also be carried out in methyl alcohol but, in this case, it is not advantageous in respect to the yield or the separation of the product.

The raw amide thus obtained can be hydrogenated as it is, or it can first be crystallized from benzene or benzene-alcohol. It is a crystalline colorless solid which melts at 109.5–110.5° C.

It is further noted that, if the starting cyanoheptadienoic ester is not pure, it will ordinarily contain a little octadiendioic diester which, with ammonia, forms an octadiendioic diamide, a compound not known until now, having a melting point of 240–243° C. The same product can also be formed by slow saponification of the nitrile by prolonged contact with aqueous ammonia. This secondary product, in any case, can be easily eliminated or recovered since it is not soluble in ethyl alcohol and can be removed as a residue.

The hydrogenation of the double bonds of the cyano-heptadienoic amide can be carried out with conventional hydrogenation catalysts. It is advisable to use supported palladium since the yields are much nearer the quantitative. As solvents, methyl alcohol and other alcohols, ethers, ketones, or also the reaction product, can be used. The temperature can vary from 0 to 120° C., preferably from 20 to 80° C.

The new amide thus obtained, i.e. the amide of suberic seminitrile, is a colorless crystalline solid, crystallizable from benzene or benzene-alcohol, having a melting point of 77–78° C.

The same amide can also be obtained by reaction of concentrated ammonia with the hydrogenation product of the cyano-heptadienoic ester, i.e. the ester of suberic seminitrile. In this case, however, the reaction in the cold is very slow and is not complete even after several days.

It is therefore convenient to operate under ammonia pressure and preferably at temperatures of between 50 and 90° C. At higher temperatures the hydrolysis of the —CN group commences to become considerable.

If it can be tolerated that the reaction be completed within a few days instead of within a few hours, it is however advisable to operate at room temperature under an ammonia pressure on the aqueous ammonia solution. Under these conditions, after a number of days, the disappearance of the two phases is noted. Upon evaporating the ammonia, the mass crystallizes. In this way very high yields are obtained. Also in case of the saturated amide, a little suberic diamide (melting point 216° C.) can be obtained as a side product, which can be removed easily by crystallization from alcohol.

The final hydrogenation of the amide of suberic seminitrile can be carried out in various solvents, such as alcohols, and with various conventional catalysts.

For the aforementioned reasons it is convenient to use inert solvents in which the reactants, the nickel or cobalt compounds, as catalysts, and ammonia are sufficiently soluble. It is advisable or preferable to use solvents selected from the group of the aliphatic, cycloaliphatic or aromatic ethers, such as propyl ether, dioxane, methylcyclohexyl ether, anisol, tetrahydrofurane or their mixtures with alcohols or hydrocarbons.

The amount of ammonia to be used should preferably be 1 to 3 moles per mole of product to be hydrogenated. The temperature can vary from 20° to 120° C., preferably from 60 to 120° C.

The hydrogen pressure accelerates the reaction but it is sufficient to use a pressure of a few tens of atmospheres.

The hydrogenated product, after filtering off the nickel or cobalt containing catalyst, can be separated by concentrating the solution or adding a solvent in which the product is scarcely soluble, e.g. gasoline. The product, crystallized from dioxane, melts at 73–74° C. The polymerization thereof carried out at 250° C., firstly in the presence of a water excess and then under vacuum, leads to a spinnable polymer having a melting point of 192° C.

We have also found that in reaction (1) a purer amide can be obtained in shorter time, if aqueous ammonia solutions are employed at concentration under 30%, preferably from 10 to 25%. The amide obtained in this way is sufficiently pure to be hydrogenated directly. The product of this reaction is mainly the amide of the 7-cyano-3,5-heptadienoic acid, a solid melting at 109.5–110.5° C., in tautomeric equilibrium with the thermodynamically less stable 2,5-form and with the more stable 2,4-form; the 7-cyano-3,5-heptadienoic acid amide is released from the equilibrium by crystallization from the ammonia solution. The reaction is carried out at 0–50° C., preferably from 15 to 30° C., under agitation. An excess of $NH_3$ in regard to the theoretical amount is employed; usually from 1 to 10 moles of $NH_3$ per mole of ester. A vessel with filtering bottom is employed over which the amide formed is deposited. To avoid filtration of the liquid during the reaction, a slight pressure of nitrogen is maintained under the filter. At the end of the reaction, a pressure of nitrogen is applied in the opposite direction thereby causing filtration to ensue. The filtrate can be employed in a new reaction. The solid contained in the filter, which is substantially the amide of the 7-cyano-3,5-heptadienoic acid, requires no further purification.

The amide of 7-cyano-3,5-heptadienoic acid is dissolved in the same organic solvent, dioxane or tetrahydrofurane, in which hydrogenation will take place. The advised organic solvent has the greatest importance for the subsequent crystallization of the aminocaprylic acid amide, which polymerizes easily and alters over 60° C. The hydrogenation can be carried out in a single stage over Raney nickel but the product is not so pure as in a two-stage hydrogenation, the first over palladium to hydrogenate the double bonds, the second over nickel to hydrogenate the nitrile group. The first stage is carried out at 0–100° C. and at atmospheric pressure. The solution is filtered to separate the catalyst. The filtrate, containing the amide of the suberic acid seminitrile, is hydrogenated in an autoclave over Raney nickel or Raney cobalt at 20–120° C. and 1–100 atm. in the presence of ammonia (from 1 to 3 moles per mole of the amide).

The catalyst is filtered off and the solution is concentrated to separate the aminocaprylic acid amide. The crystallization from the same solvent gives the pure amide, M.P. 73–74° C. To avoid alteration of the amide it is convenient to effect the crystallization under 60° C.

The following examples are illustrative and are not intended to limit the scope of the present invention.

*Example 1*

30 grams of methyl ester of 7-cyano-2,5-heptadienoic acid are contacted with 30 cc. 30% ammonia solution in a shaking autoclave.

After 5 hours a bulky crystalline mass has already precipitated. The agitation is continued for 24 hours. The separated solid is then filtered. Another portion of product is recovered by concentrating the solution under vacuum. In total, 22.5 g. raw amide of 7-cyano-heptadienoic acid are obtained. The amide thus obtained melts at 103–105° C. The mother liquor can be recycled after saturation with ammonia. After recrystallization from the ethyl alcohol the amide melts at 109.5–110.5° C.

22 grams of 7-cyano-heptadienoic acid amide are dissolved in alcohol and hydrogenated in the presence of 1 g. catalyst constituted of palladium supported on calcium carbonate at 30° C. under a pressure of 40 atm. hydrogen.

21 grams of the amide of suberic seminitrile are thus obtained, which after crystallization from benzene-alcohol, melts at 77.5–78° C.

20 grams of amide of suberic seminitrile are placed in an autoclave together with 400 g. dioxane and 2 cc. wet Raney nickel.

Gaseous ammonia is dissolved in the mixture. Hydrogen under a pressure of 60 atm. is then introduced and the autoclave is heated to 100° C. for 4 hours.

The autoclave is then cooled, Raney nickel is filtered off and the solution is concentrated to a small volume under vacuum at a temperature not higher than 50° C.

From the solution 18.5 grams of amide of omega-aminocaprylic acid, a solid white mass having a melting point of 65–70° C., are recovered.

After crystallization from dioxane the melting point rises to 74–75° C.

*Example 2*

30 grams of raw methyl ester of undistilled 7-cyano-2,5-heptadienoic acid, obtained by synthesis from chlorocyano-butene, acetylene and CO, and containing 75% of methyl 7-cyano-2,5-heptadienoate, after separation from the aqueous nickel chloride solution and distilling off the solvent, are shaken for 24 hours with 30 cc. of a concentrated aqueous ammonia solution.

By operating as in the preceding example, 19 grams of a solid product are obtained, which are then crystallized from ethyl alcohol; 16 grams 7-cyano-heptadienoic acid amide, melting point 109–110° C., are recovered.

The amide thus obtained is dissolved in methyl alcohol and hydrogenated at 40° C. under a hydrogen pressure of 40 atm. on a catalyst consisting of palladium supported on calcium carbonate.

The solution is filtered and methyl alcohol is evaporated. The amide of suberic seminitrile is dissolved in dioxane as in the preceding example and hydrogenated on Raney nickel in the presence of ammonia.

13 grams of raw amide of omega-aminocaprylic acid are obtained.

Example 3

30 grams of the methyl ester of suberic seminitrile, obtained by hydrogenation of cyano-heptadienoic ester, are treated with 30 cc. of a 30% aqueous ammonia solution.

22 grams of the amide of suberic seminitrile are recovered, having a melting point of 76–77° C. The amide thus obtained is mixed with 200 grams dioxane and hydrogenated on 2 cc. Raney nickel in the presence of 8 g. $NH_3$. By concentrating and adding ethyl ether to the dioxane solution, 16.5 g. raw amide of omega-aminocaprylic acid (melting point 70.5–72.5° C.) are separated. Upon further concentration, 4 g. of additional product having a melting point of 65–70° C. are obtained.

Example 4

Methyl ester of suberic seminitrile is employed as in the preceding example but operating in an agitated autoclave under ammonia pressure at 70° C. for 6 hours.

Starting from 30 g. ester, 36 g. 30%-ammonia solution and gaseous ammonia (pressure of the mixture at 25° C.: 4 atm.) are employed.

The product thus obtained is a homogeneous phase which, upon simple rubbing or sowing, crystallizes as a white mass consisting of the amide of suberic seminitrile which, after filtration and drying, weighs 25 g. Its melting point is 74–75° C.

Upon crystallization from benzene-alcohol the melting point rises to 77–78° C. Upon hydrogenation in dioxane as in the preceding example, 17.5 g. amide of omega-aminocaprylic acid are recovered.

Example 5

30 grams methyl ester of 7-cyano-heptadienoic acid are treated as in the preceding examples 1 and 2 with a 30% ammonia solution. The 7-cyano-heptadienoic acid amide thus obtained is hydrogenated on palladium in dioxane at 40° C. under a hydrogen pressure of 40 atm.

The solution is filtered and, without removing the product, is hydrogenated again by adding ammonia and Raney nickel at 100° C. under a hydrogen pressure of 40 atm.

From the concentrated solution, 18 grams raw amide of omega-aminocaprylic acid are obtained.

Example 6

The operation is carried out as in the preceding example but using, in place of palladium, the same catalyst on the basis of nickel as that used for the second hydrogenation stage.

In a single step 17.5 grams raw amide of omega-aminocaprylic acid can thus be obtained from 22 g. cyano-heptadienoic acid amide, 150 cc. dioxane, 6 g. ammonia and 3 cc. Raney nickel at 100° C. for 3.5 hours.

Example 7

The amide of suberic of seminitrile is prepared as described in the preceding examples.

The hydrogenation of the amide of suberic seminitrile, however, is carried out in tetrahydrofurane at 100° C. under 60 atm. hydrogen on Raney nickel in the presence of ammonia.

Starting with 8 grams amide of suberic seminitrile, 7 g. amide of aminocaprylic acid (melting point 67–72° C.) are recovered.

Example 8

The amide of suberic seminitrile is prepared as described in the preceding examples.

The hydrogenation however is carried out in methyl alcohol at 100° C. under 60 atm. hydrogen, in the presence of Raney nickel and ammonia.

Methyl alcohol is distilled off and the product is crystallized from dioxane.

Example 9

10.1 grams of methyl ester of suberic seminitrile are placed in a glass tube with 10 cc. 30% ammonia solution and 10 cc. liquid $NH_3$. After 12 days, the ammonia is discharged and the solution filtered. The dried residue weighs 8.9 g. and has a melting point of 76.5–77.5° C.

The amide of suberic seminitrile is reduced in dioxane with $H_2$ under a pressure of 50 atm., at 80° C. in the presence of 1 cc. wet Raney cobalt. The duration of the reduction was 6 hours.

By concentration of the solvent, white small crystals of omega-aminocaprylic amide are obtained which, after washing with ethyl ether and vacuum drying, weigh 6.7 g. (melting point 71–73° C.).

From the crystallization solvent, a white mass of amide, having a melting point of 67–71° C. and amounting to 1.7 g., is recovered by further concentration.

In order to obtain nylon 8, the amide of omega-aminocaprylic acid is polymerized according to conventional methods, for example according to the process described in Dutch Patent 61,734, which relates to the preparation of polyamidic compounds, starting from the amides of amino acids having more than five carbon atoms.

Example 10

5 g. of the methyl ester of the 7-cyano-2,5-heptadienoic acid and 20 g. of a 15% aqueous ammonia solution are placed in a closed vessel, fitted with mechanical agitator, warming or cooling water jacket and filtering bottom. A slight nitrogen pressure is maintained below the filter. After 2½ hours a crystalline mass is formed, which is agitated for 2 hours. The nitrogen pressure is released below the filter and a nitrogen pressure is applied over the filter to speed the filtration of the mixture. The filtrate is employed in a new run.

The solid on the filter, 3.5 g., is dissolved in dioxane and hydrogenated at 20° C. over 5% palladium-carbon catalyst. The solution, containing the amide with the two hydrogenated double bonds, is separated by filtration from the catalyst. The solution is placed in an autoclave together with Raney nickel and 2 moles of ammonia per mole of amide. The hydrogenation is carried out at 60° C. under 40 atm. $H_2$. The catalyst is filtered and the solution concentrated under vacuum under 60° C.

By cooling, 3 g. of the amide of the omega-aminocaprylic acid crystallize. Upon recrystallization from the same solvent, the amide melts at 73–74° C. By warming at 250° C. it polymerizes in a horny mass which can be stretched in threads.

We claim:
1. The amide of 7-cyano-3,5-heptadienoic acid.
2. A process for preparing the amide of omega-aminocaprylic acid from the methyl ester of 7-cyano-2,5-heptadienoic acid, characterized in treating said ester with am- monia at a temperature between 0 and 50° C., to obtain 7-cyano-heptadienoic amide, treating the latter with hydrogen in the presence of palladium catalyst on a carrier selected from calcium carbonate carbon, at a temperature between 0 and 120° C., in a medium taken from the group consisting of methanol, ethanol, ethyl ether, dioxane and tetrahydrofuran, to transform it into the amide of suberic seminitrile, treating the latter with hydrogen in the presence of ammonia and a metal catalyst taken from the group consisting of nickel and cobalt, in an inert solvent taken from the group consisting of dioxane and tetrahydrofuran, at a temperature between 60° and 120° C., to make the amide of omega-aminocaprylic acid.

3. A process for preparing the amide of omega-aminocaprylic acid from a lower alkyl ester of 7-cyano-2,5-heptadienoic acid, said alkyl ester being selected from the group consisting of methyl, ethyl and propyl, hydrogenating the latter in the presence of palladium catalyst on a carrier selected from calcium carbonate and carbon, and reacting the alkyl ester of suberic seminitrile thus obtained, at a temperature of between 0° and 140° C., with ammonia under pressure to form the amide of omega-aminocaprylic acid.

4. A process for preparing the amide of omega-aminocaprylic acid from the methyl ester of 7-cyano-2,5-heptadienoic acid which comprises treating 7-cyano-2,5-heptadienoic acid with an excess of a 10 to 25% aqueous ammonia solution at a temperature from 0° to 50° C., separating the resulting amide, hydrogenating said amide in the presence of a catalyst selected from the group consisting of nickel and cobalt in a medium selected from the group consisting of dioxane and tetrahydrofuran, to yield directly the amide of omega-aminocaprylic acid.

5. A process for preparing the amide of omega-aminocaprylic acid from the methyl ester of 7-cyano-2,5-heptadienoic acid which comprises treating 7-cyano-2,5-heptadienoic acid with an excess of a 10 to 25% aqueous ammonia solution at a temperature from 0° to 50° C., separating the resulting amide, hydrogenating said amide in the presence of a palladium catalyst, in a medium selected from the group consisting of dioxane and tetrahydrofuran to yield the amide of suberic seminitrile, hydrogenating the latter in the presence of ammonia and a catalyst selected from the group consisting of nickel and cobalt at a temperature between 20° and 120° C., to yield the amide of omega-aminocaprylic acid.

References Cited by the Examiner
UNITED STATES PATENTS

| | | | |
|---|---|---|---|
| 2,327,119 | 8/1943 | Martin | 260—561 |
| 2,354,909 | 8/1944 | Carlson | 260—561 |

OTHER REFERENCES

Gilman et al.: "Organic Synthesis," vol. 1, 2nd ed., 1941, page 179.

Groggins: "Unit Processes in Organic Synthesis," 4th ed., 1952, pp. 490–492.

CHARLES B. PARKER, *Primary Examiner.*